US009988517B2

(12) United States Patent
Chen et al.

(10) Patent No.: US 9,988,517 B2
(45) Date of Patent: Jun. 5, 2018

(54) PHYSICAL COLORANTS FOR PLASTICS BASED ON THE CHRISTIANSEN EFFECT

(75) Inventors: Sung-Wei Chen, Las Vegas, NV (US); Christopher J. Rothfuss, Laramie, WY (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 78 days.

(21) Appl. No.: 13/879,700

(22) PCT Filed: Jun. 5, 2012

(86) PCT No.: PCT/US2012/040826
§ 371 (c)(1),
(2), (4) Date: Dec. 6, 2014

(87) PCT Pub. No.: WO2013/184094
PCT Pub. Date: Dec. 12, 2013

(65) Prior Publication Data
US 2015/0329699 A1    Nov. 19, 2015

(51) Int. Cl.
| *C08K 3/40* | (2006.01) |
| *H01F 1/01* | (2006.01) |
| *C08L 75/04* | (2006.01) |
| *C08L 1/02* | (2006.01) |
| *B03C 7/00* | (2006.01) |
| *B03C 1/02* | (2006.01) |
| *C09D 5/00* | (2006.01) |
| *C09D 11/00* | (2014.01) |
| *C09D 5/23* | (2006.01) |
| *C08F 8/00* | (2006.01) |

(52) U.S. Cl.
CPC ............... *C08K 3/40* (2013.01); *B03C 1/02* (2013.01); *B03C 7/00* (2013.01); *C08F 8/00* (2013.01); *C08L 1/02* (2013.01); *C08L 75/04* (2013.01); *C09D 5/00* (2013.01); *C09D 5/23* (2013.01); *C09D 11/00* (2013.01); *H01F 1/01* (2013.01); *C08F 2810/40* (2013.01)

(58) Field of Classification Search
None
See application file for complete search history.

(56) References Cited

U.S. PATENT DOCUMENTS

| 3,418,656 | A | * | 12/1968 | Vassiliades ............... B01J 13/12 |
| | | | | 424/497 |
| 3,844,816 | A | * | 10/1974 | Vassiliades ............... B01J 13/18 |
| | | | | 264/4.3 |
| 4,008,083 | A | * | 2/1977 | Pye .......................... G03F 7/027 |
| | | | | 359/244 |
| 4,075,134 | A | | 2/1978 | Morehouse, Jr. et al. |
| 4,179,546 | A | | 12/1979 | Garner et al. |
| 5,932,309 | A | | 8/1999 | Smith et al. |
| 6,224,794 | B1 | | 5/2001 | Amsden et al. |
| 7,479,323 | B2 | | 1/2009 | Rathschlag et al. |
| 7,968,117 | B1 | * | 6/2011 | Morrison ............. A61K 9/1277 |
| | | | | 424/450 |
| 2003/0194578 | A1 | | 10/2003 | Tam et al. |
| 2004/0126072 | A1 | | 7/2004 | Hoon Lee et al. |
| 2004/0262583 | A1 | | 12/2004 | Lee |
| 2006/0034772 | A1 | | 2/2006 | Unger |
| 2006/0054863 | A1 | | 3/2006 | Dai et al. |
| 2008/0192098 | A1 | * | 8/2008 | Tsuru ..................... C09D 11/40 |
| | | | | 347/100 |
| 2011/0166289 | A1 | | 7/2011 | Yadav |

FOREIGN PATENT DOCUMENTS

| CN | 1616554 A | 5/2005 |
| CN | 1620527 A | 5/2005 |
| WO | WO 03/053593 A2 | 7/2003 |

OTHER PUBLICATIONS

Carlon (Christiansen effect in IR spectra of soil-derived atmospheric dusts. Appl Opt. Nov. 1, 1979;18(21):3610-4.*
International Search Report and Written Opinion for PCT/US2012/040826 dated Aug. 22, 2012.
Balasubramanian et al., New Christiansen Filters, *Applied Optics* (1992), 31(10):1574-1587 (Abstract).
Clarke, A Theory for the Christiansen Filter, *Applied Optics* (1668), 7(5):861-868 (Abstract).
Denmarak et al., Optimum Grain Size in the Christiansen Filter, *Journal of the Optical Society of America*, (1935), 25(10):330-331 (Abstract).
Dispersion, http://en.wikipedia.org/wiki/Dispersion (Printed from Internet Oct. 5, 2012).
BASF—Product Information BASF Functional Polymers NAFTA—Firemist®, http://worldaccount.basf.com/wa/NAFTA/Catalog/FunctionalPolymers/pi/BASF/Brand/firemist (Printed from Internet Oct. 5, 2012).
Hai et al., Preparation of magnetic nanoparticles embedded in polystyrene microspheres, *Journal of Physics: Conference Series* (2009), vol. 187 (Abstract).
Hedman et al., The Christiansen Effect in Saturn's narrow dusty rings and the spectral identification of clumps of the F ring, *Department of Astronomy, Cornell University, Ithaca, New York (USA)*, Mar. 31, 2011.
Istasse, Contribution to the study of hydrodynamic dispersion and its coupling to the natural convection in porous fractued models, Faculty of Applied Science-Chemistry, Ph.D. Dissertation, Universite Libre de Bruxelles, (May 4, 2004).
Kaskey, DuPont Raises Forecast as Paint-Pigment Prices Boost Profit, Bloomberg News (Jul. 28, 2011).
Kotkoskie et al., Qualitative investigation of uptake of fine particle size microcrystalline cellulose following oral administration in rats, *J. Anat.* (1996), 189:531-535.

(Continued)

*Primary Examiner* — Jake Vu (57) ABSTRACT

Microsphere compositions containing a mixture of at least two materials with same or differing phases are described. The materials have differing optical dispersion curves that intersect at at least one particular wavelength exhibiting the Christiansen effect. The materials may be encompassed by a microsphere, which may also include a separation entity.

21 Claims, 4 Drawing Sheets

(56) References Cited

OTHER PUBLICATIONS

Matsumoto Microsphere® F and FN Series, http://www.mtmtys.co.jp/e/product/general/data01.html (Printed from Internet Oct. 5, 2012).

Okoshi et al., The Christiansen effect of brightly colored colloidal dispersion with an amphiphilic polymer, *Journal of Colloid and Interface Science* (Jul. 15, 2003), 263(2):473-477 (Abstract).

Prost, The Influence of the Christiansen Effect on I.R. Spectra of Powders, *Clays and Clay Materials* (1973), 21:363-368.

Qi et al., Synthesis of large-sized monodisperse polystyrene microspheres by dispersion polymerization with dropwise monomer feeding procedure, *Colloid & Polymer Science* (2009), 287(2):243-248 (Abstract).

Raman, The Theory of the Christiansen Experiment *Raman Research Institute, Bangalore* (1949), 381-390.

Volume Precision Glass, Inc., Santa Rosa, California (USA), http://vpglass.com/optical_glass/nbak4_optical.glass.html (Printed from Internet Oct. 5, 2012).

World Pigment Market: Market Report, (Dec. 2007), http://acmite.com/market-reports/chemicals/world-pigment-market.html.

Yeh, Christiansen-Bragg Filters, *Optics Communications* (Oct. 1980), 35(1):9-14 (Abstract).

Zhang et al., Facile synthesis of spherical cellulose nanoparticles, *Carbohydrate Polymers* (Feb. 7, 2007), 69:607-611.

Extended European Search Report for counterpart European Application No. 12878222A, dated Nov. 16, 2015.

Cocero et al., Encapsulation and Co-Precipitation Processes with Supercritical Fluids: Fundamentals and Applications, *The Journal of Supercritical Fluids* (2009), 47(3):546-555.

Firemist® Red 9G430L, Effect Pigments, Technical Data Sheet, BASF, accessed at http://worldaccount.basf.com/wa/NAFTA/Catalog/FunctionalPolymers/doc4/BASF/PRD/30322543/.pdf?title=Firemist_Red_9G430L&asset_type=ti/pdf&language=EN&urn=urn:documentum:eCommerce_sol_EU:09007bb280084707.pdf, revised on Aug. 2009, pp. 1-3.

JDavis, BASF Develops Liquid Metal as an Automotive Paint for Mercedes-Benz F 800 Style, accessed at, https://web.archive.org/web/20120601033814/http://www.emercedesbenz.com/autos/mercedes-benz/concept-vehicles/basf-develops-liquid-metal-as-an-automotive-paint-for-mercedes-benz-f-800-style/, posted Apr. 26, 2010, pp. 1-2.

* cited by examiner

PHYSICAL COLORANTS FOR PLASTICS BASED ON THE CHRISTIANSEN EFFECT

CROSS-REFERENCE TO RELATED APPLICATION

This application is a U.S. National Stage filing under 35 U.S.C. § 371 of International Application No. PCT/US2012/040826, filed on Jun 5, 2012 and entitled "Physical Colorants For Plastics Based On The Christiansen Effect," the disclosure of which is incorporated by reference in its entirety.

BACKGROUND

Colorants are typically chemical-based dyes that generate colors based on selective absorption of radiation through electronic transitions. Specific chemical groups have disparate electronic transitions, so the production of particular colors introduces chemical reactivity, leading to chemical complexity. Unlike such chemical colorants, physical colorants produce color through physical effects, such as, for example, diffraction, thin film interference, photonic crystal interaction, or plasmon resonance. In addition to producing color, physical colorants can also produce effects that chemical dyes cannot, such as, for example, pearlescence, metallic sheens, infrared blocking, viewing angle dependent color, temperature dependent color, and so forth.

One physical effect capable of modulating color is the so-called Christiansen effect, first described by Christian Christiansen in 1884, using differences in dispersion curves between various materials. A dispersion curve for a material characterizes the frequency dependence of the refractive index of the material. The Christiansen effect may be summarized as monochromatic (or narrow band) transparency effect produced in multiphasic materials when the multiple phases have intersecting dispersion curves. Christiansen discovered that a mass of glass particles immersed in a liquid totally transmitted the light wavelength at which the liquid and the glass particles had the same refractive index. All other wavelengths of the spectrum are reflected, scattered, or refracted at the many interfaces between the liquid and glass particles. It was also observed that the wavelength of transmitted light can be changed by changing the type of glass or changing the temperature of the liquid. The basic theory of the Christiansen effect can be found in the work by Raman (Raman, C. V., "The theory of the Christiansen Experiment", Proceedings of Indian Academy of Sciences; 1949, A29: 381-390) and Clarke (Clarke, R. H., "A theory of the Christiansen filter", Applied Optics; 1968, 7:861-868).

BRIEF SUMMARY

In one embodiment, a microsphere composition comprising a mixture of at least two materials with the same or differing phases is described. The materials have differing optical dispersion curves that intersect at at least one particular wavelength exhibiting the Christiansen effect. In some embodiments, the materials may be encompassed by a microsphere. In some embodiments, the microspheres may include a separation entity.

In an embodiment, a physical colorant, ink or pigment comprising a microsphere composition comprising a mixture of at least two materials with the same or differing phases is described. In some embodiments, the physical colorant, ink, or pigment may include a separation entity for separating the colorant from the material it colors.

In an embodiment, an article of manufacture at least partially coated with the physical colorant, ink or pigment comprising a microsphere composition comprising a mixture of at least two materials with the same or differing phases is described. The materials have differing optical dispersion curves that intersect at at least one particular wavelength exhibiting the Christiansen effect. In some embodiments, a separating entity may be included in the physical colorant, ink or pigment.

In an embodiment, a method of separating an article of manufacture from a mixture of articles of manufacture is described. The article of manufacture to be separated is at least partially coated with the physical colorant, ink, or pigment comprising a microsphere composition comprising a mixture of at least two materials with the same or differing phases. The physical colorant, ink, or pigment includes a magnetic or electrostatic separation entity. Magnetic or electric field is applied to the mixture of articles of manufacture in order to separate the article of manufacture at least partially coated with the physical colorant, ink, or pigment. In some embodiments, the article of manufacture to be separated may be a recyclable item, a metallic, or a glass container.

In an embodiment, a method of separating a microsphere from a polymer composition is described. The microsphere comprises a mixture of at least two materials with the same or differing phases, the materials having differing optical dispersion curves that intersect at at least one particular wavelength and includes a magnetic of electrostatic separation entity. The microsphere may be separated from the polymer composition by application of a magnetic or an electric field.

DETAILED DESCRIPTION

This disclosure is not limited to the particular systems, devices, and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to." All ranges disclosed herein are inclusive of their endpoints and combinable.

Microsphere Compositions for Physical Colorants

A microsphere composition for a colorant based on the Christiansen effect is described herein. In some embodiments, the composition may be used as a recyclable or a reusable colorant.

Figure 1:
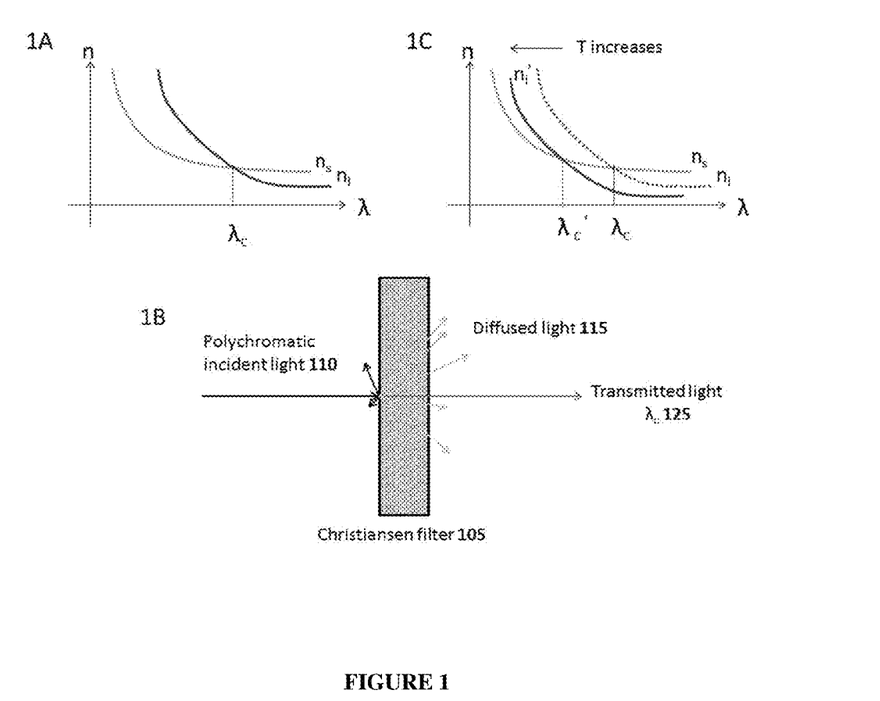
FIG. 1. Representative illustration of the Christiansen effect. 1A shows dispersion curves of a liquid and a solid material, intersecting at the Christiansen wavelength. 1B depicts the chromatic filtering effect of a Christiansen filter. 1C depicts the change in Christiansen wavelength as temperature is varied.

In some embodiments, the composition may be a mixture of two or more materials, at least one of them being in the form of microspheres, with differing optical dispersion curves intersecting at at least one wavelength. FIG. 1A shows dispersion curves of two materials, the first being a solid (dispersion curve denoted by $n_s$) and the second being a liquid (dispersion curve denoted by $n_l$). The two curves intersect at a wavelength $\lambda_c$ (Christiansen wavelength). According to the Christiansen effect, a mixture of small particles of the solid in the liquid is transparent at $\lambda_c$. A typical Christiansen filter 105 may be produced by adding a large number of small particles of the solid with its dispersion curve denoted by $n_s$ to the liquid with its dispersion curve denoted by $n_l$. Polychromatic light 110 incident on the Christiansen filter will be reflected, refracted, or scattered (diffused light 115) for all wavelengths except $\lambda_c$, which is transmitted 125. Dispersion curves of liquids are sensitive to temperature and typically shift left (see FIG. 1C). This causes a blue-shift in the Christiansen wavelength when the temperature of the liquid is increased.

Figure 2:
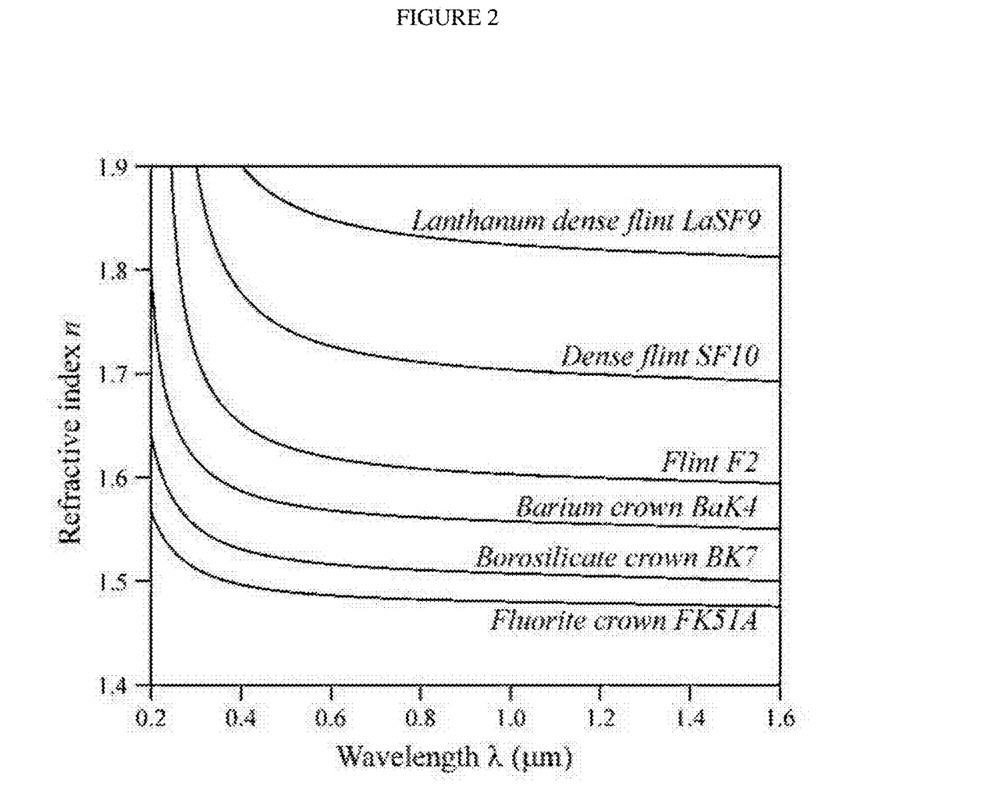
FIG. 2. Representative dispersion curves of various types of glass.

In general, the two materials forming a Christiansen filter need not be of different phases. Two solids may exhibit the Christiansen effect when particles of one solid are embedded in another solid. FIG. 2 shows dispersion curves for various solid materials. In some embodiments, the materials may all have the same phase, such as, for example, a solid. In other embodiments, at least one of the materials may be a liquid and at least one other material may be a solid.

In some embodiments, the microspheres may have a diameter from about 1 μm to about 500 μm. In some embodiments, the microspheres may have a diameter from about 50 μm to about 100 μm. In some embodiments, the microspheres may have a diameter from about 1 μm to about 10 μm. In some embodiments, the microspheres may have a diameter from about 100 μm to about 200 μm, or from about 200 μm to about 300 μm, or about 300 μm to about 400 μm, and so forth. Specific examples of diameters include, but are not limited to, about 1 μm, about 10 μm, about 50 μm, about 100 μm, about 200 μm, about 300 μm, about 400 μm, about 500 μm, and ranges between any two of these values. In a population of a plurality of microspheres, at least about 75%, at least about 80%, at least about 85%, at least about 90%, at least about 95%, at least about 96%, at least about 97%, at least about 98%, at least about 99%, or all of the microspheres have the stated diameter.

Figure 3:
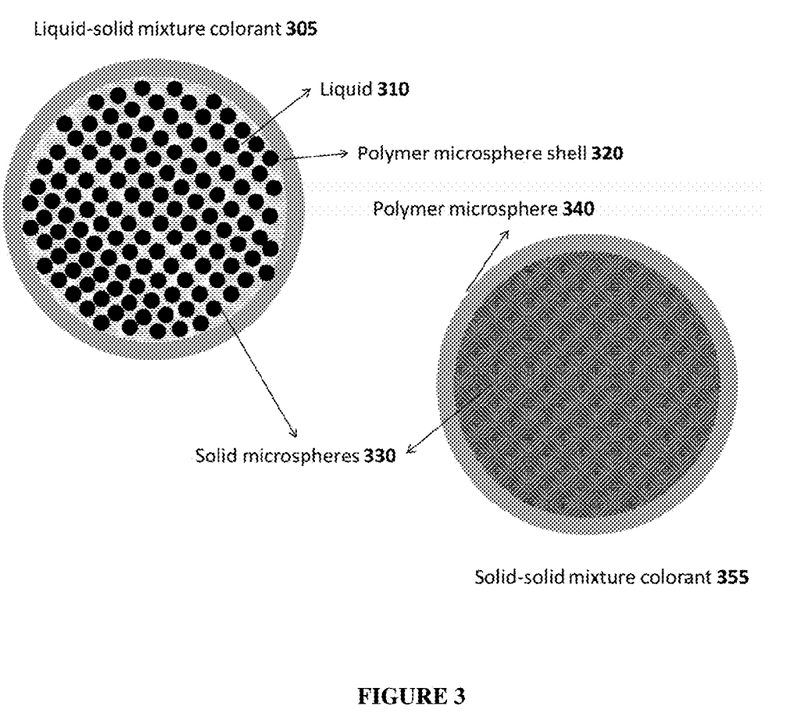
FIG. 3. Representative illustration of a liquid-solid and a solid-solid microsphere colorant.

In some embodiments, the microspheres comprise a shell encompassing a material (see FIG. 3). In certain embodiments, the material of the shell and the material encompassed thereby may be the same (as in 340). In some embodiments, the shell may comprise a glass or a polymer, or any combination thereof. Examples of polymers that may be used include, but are not limited to, organic polymers, inorganic polymers, co-polymers thereof, polyolefins, polyaromatics, polycyclics, polyheterocyclics, polysilanes such as, for example, polyethylene, polystyrene, polyurethane, polyhydroxyalkanoate, polymethacylate, polymethyl methacralate, polydimethyl siloxane, and/or the like, and any combinations thereof. In some embodiments, the microspheres may comprise at least two different materials.

In some embodiments, the composition may comprise at least two different solid materials, as depicted in FIG. 3 (see 355). In some embodiments, at least one of the materials may be in the form of microspheres 330. In some embodiments, the materials may be, for example, a polymer, a co-polymer, a glass, a wax, a crystal, or an amorphous solid, or any combination thereof. Examples of polymer materials include, but are not limited to, poly methyl methacralate (PMMA), S-low styrene, polyethylene, polyethylene terephthalate (PET), polyacrylate, polycarbonate, and so forth. Examples of co-polymers include, but are not limited to, PMMA/styrene, co-block polyethylene/polyacrylate, and so forth. Examples of glasses include, but are not limited to, fluorite crown glass, borosilicate glass, barium crown glass, silica glass, and the like. Waxes may be, for example, organic waxes or carnuba wax. Crystals may be, for example, diamond, quartz, various cuprates, sodium chloride, potassium chloride, and the like. Examples of amorphous solids include, but are not limited to, amorphous glass, various metal oxides, various doped metal oxides, and the like.

In some embodiments, the composition may comprise a solid microsphere and at least one liquid. An example of such is depicted in FIG. 3 (see 305). In some embodiments, the liquid may be, for example, carbon disulfide, benzene, glycerol, methyl salicylate, ethyl salicylate, ethylene glycol, acetone, silicone oil, an organic oil, an alcohol, an aldehyde, an ether, an ester, water, or a salt solution, or any combination thereof. In some embodiments, the microspheres may comprise a solid such as, for example, cellulose, a thermoplastic, or a polymer, or any combination thereof. In some embodiments, the ratio of the solid phase to the liquid phase may be about 1:1 (by weight). In some embodiments, the ratio of the solid phase to the liquid phase may be such that the composition is mostly in liquid phase with a thin solid coating. In some embodiments, the ratio of solid phase to liquid phase may be such that the composition is mostly in solid phase with a solid shell having a small amount of liquid core. Examples of the ratio of solid phase to liquid phase (by weight) include, but are not limited to, 0.0001:1, 0.001:1, 0.01:1, 0.1:1, 1:1, 1:0.1, 1:0.001, 1:0.0001, and/or ranges between any two of these values.

In some embodiments, the composition may comprise at least one separation entity. In some embodiments, the microsphere may comprise the separation entity. In some embodiments, one of the materials comprising the composition may comprise the separation entity. In some embodiments, the separation entity may be, for example, a magnetic entity, an electrostatic entity, a ferroelectric entity, a paramagnetic entity, a superparamagnetic entity, a density differing entity, or a functionalized moiety, or any combination thereof. In some embodiments, the separation entity may be characterized by a differing physical property such as, for example, hydrophobicity, hydrophilicity, dispersibility, thermal stability, dimensional stability, density, and strength, or any combination thereof. Examples of a magnetic entity include, but are not limited to, magnetic or paramagnetic microparticles of materials such as, for example, cobalt, ferrite, gadolinium, magnetite, nickel, iron, samarium-cobalt, nickel-iron alloys, alnico, strontium ferrite, and the like. An electrostatic entity may be, for example, a positively or negatively charged microsphere. Examples of a ferroelectric entity include, but are not limited to, microparticles of barium titanate, europium barium titanate, lead titanate, lead zirconate titanate, lithium niobate, potassium sodium tartarate, polyvinylidene fluoride, and so forth. Examples of density differing entities include materials that will provide density differential such as, for example, making part of the composition heavier using metal nanoparticles, heavy plastics, and the like; or making part of the composition lighter using gases (air, nitrogen and the like), low density polyethylene, and the like. Functionalized moieties may be microparticles coated with, for example, biotin; streptavidin; specific chemical groups such as acetyl, acyl, carboxyl, and so forth; specific polymer ligands; and so forth.

In some embodiments, the composition may be separated or recycled by using at least one biodegradable component.

Methods for Making Microsphere Compositions for Physical Colorants

Methods of preparing a microsphere composition described herein are provided. In some embodiments, the method comprises encapsulating a mixture of two or more materials of the same or differing phases within a microsphere shell, wherein the materials have differing optical dispersion curves intersecting at at least one particular wavelength.

In some embodiments, the two or more materials may be solid, while in some embodiments, at least one of the materials may be a liquid and at least one other material may be a solid. Examples of liquids include, but are not limited to, carbon disulfide, benzene, glycerol, methyl salicylate, ethyl salicylate, ethylene glycol, acetone, silicone oil, an organic oil, an alcohol, an aldehyde, an ether, an ester, water, and a salt solution, or any combination thereof.

In some embodiments, the solid being encapsulated and the solid of the microsphere shell are the same. Examples of solids that may be used for microsphere compositions described herein include, but are not limited to, a polymer, a co-polymer, a glass, a wax, a crystal, and an amorphous solid, or any combination thereof.

In some embodiments, the encapsulation is achieved by injecting a first phase into a moving solution of a second phase thereby encapsulating the second phase into a shell of the first phase. In some embodiments, the encapsulation is achieved by drop-wise dispersion polymerization. In some embodiments, the encapsulation is achieved by emulsion polymerization. In some embodiments, the emulsion polymerization may include dispersing a mixture a desired liquid with a monomer in water and subjecting the dispersion to emulsion polymerization conditions. The monomer is chosen such that the liquid is soluble in the monomer but insoluble in a polymer formed of the monomer. The emulsion polymerization conditions include agitation of the dispersion in presence of a free-radical catalyst at a temperature of about 40° C., about 45° C., about 50° C., about 55° C., about 60° C., about 65° C., about 70° C., about 75° C., about 80° C., about 85° C., about 90° C., about 95° C., about 100° C., about 105° C., about 110° C., or ranges between any two of these values. In some embodiments, the monomer is an ethylenically unsaturated monomer. Examples of ethylenically unsaturated monomers include, but are not limited to, alkylenes, arylenes, aralkylenes, haloalkynes, haloarylene, alkoxyalkylene, haloalkylalkylene, haloarylalkylene, aryloxyalkylene, cycloalkylene, alkoxyarylene, aryloxyalkylene, comonomers thereof, and/or the like. A skilled artisan will be able to select appropriate combinations and ratios of individual components necessary for emulsion polymerization. Similarly, the emulsion polymerization conditions such as, for example, temperature, catalysts, agitation rates, and the like, will be apparent to one skilled in the art.

In some embodiments, the composition may be prepared by electrospraying. One skilled in the art will be able to optimize the desired conditions including, but not limited to, applied voltage, working distance, flow rate of the liquid, nozzle diameter, physical and chemical properties of the liquid, viscosity of the liquid, substrate material, substrate environment, temperature, and/or the like in order to obtain the desired size and composition of the microspheres.

Physical Colorant, Ink, or Pigment

In some embodiments, a physical colorant, a pigment or an ink comprising a microsphere composition described herein is provided. In some embodiments, the physical colorant, pigment, or ink may comprise a microsphere composition comprising a mixture of two or more materials, at least one of them being in the form of a microsphere, with differing optical dispersion curves intersecting at at least one wavelength. In some embodiments, the materials may all have the same phase, such as, for example, solid. In some embodiments, at least one of the materials may be a liquid and at least one other material may be a solid.

In some embodiments, the microspheres may have a diameter from about 1 µm to about 500 µm. In some embodiments, the microspheres may have a diameter from about 50 µm to about 100 µm. In some embodiments, the microspheres may have a diameter from about 1 µm to about 10 µm. Specific examples of diameters include, but are not limited to, about 1 µm, about 10 µm, about 50 µm, about 100 µm, about 200 µm, about 300 µm, about 400 µm, about 500 µm, and ranges between any two of these values. In a population of a plurality of microspeheres, at least about 75%, at least about 80%, at least about 85%, at least about 90%, at least about 95%, at least about 96%, at least about 97%, at least about 98%, at least about 99%, or all of the microspheres have the stated diameter.

In some embodiments, the microspheres comprise a shell encompassing a material. In some embodiments, the material of the shell and the material encompassed thereby may be the same. In some embodiments, the shell may comprise a glass, a polymer, or any combination thereof. In some embodiments, the polymer may be, for example, polyhydroxyalkanoate, polyurethane, or polystyrene, or any combination thereof. In some embodiments, the microspheres may comprise at least two different materials.

In some embodiments, the physical colorant, pigment, or ink may comprise a microsphere composition comprising at least two different solid materials. In some embodiments, at least one of the materials may be in the form of microspheres. In some embodiments, the materials may be, for example, a polymer, a co-polymer, a glass, a wax, a crystal, or an amorphous solid, or any combination thereof. Examples of polymer materials include, but are not limited to, poly methyl methacralate (PMMA), S-low styrene, polyethylene, polyethylene terephthalate (PET), polyacrylate, polycarbonate, and so forth. Examples of co-polymers include, but are not limited to, PMMA/styrene, co-block polyethylene/polyacrylate, and so forth. Examples of glasses include, but are not limited to, fluorite crown glass, borosilicate glass, barium crown glass, silica glass, and the like. Waxes may be, for example, organic waxes or carnuba wax. Crystals may be, for example, diamond, quartz, various cuprates, sodium chloride, potassium chloride, and the like. Examples of amorphous solids include, but are not limited to, amorphous glass, various metal oxides, various doped metal oxides, and the like.

In some embodiments, the physical colorant, pigment, or ink may comprise a microsphere composition comprising a solid microsphere and at least one liquid. In some embodiments, the liquid may be, for example, carbon disulfide, benzene, glycerol, methyl salicylate, ethyl salicylate, ethylene glycol, acetone, silicone oil, an organic oil, an alcohol, an aldehyde, an ether, an ester, water, or a salt solution, or any combination thereof. In some embodiments the microspheres may comprise a solid such as, for example, cellulose, a thermoplastic, or a polymer, or any combination thereof. In some embodiments, the ratio of the solid phase to the liquid phase may be 1:1 (by weight).

In some embodiments, the physical colorant, pigment, or ink may comprise a microsphere composition comprising at least one separation entity. In some embodiments, the microsphere may comprise the separation entity. In some embodiments, one of the materials comprising the composition may comprise the separation entity. In some embodiments, the separation entity may be, for example, a magnetic entity, an electrostatic entity, a ferroelectric entity, a superparamagnetic entity, a density differing entity, or a functionalized moiety, or any combination thereof. In some embodiments, the separation entity may be characterized by a differing physical property such as, for example, hydrophobicity, hydrophilicity, dispersibility, thermal stability, dimensional stability, density, or strength, or any combination thereof. Examples of a magnetic entity include, but are not limited to, magnetic or paramagnetic microparticles of materials such as, for example, cobalt, ferrite, gadolinium, magnetite, nickel, iron, samarium-cobalt, nickel-iron alloys, alnico, strontium ferrite, and the like. An electrostatic entity may be, for example, a positively or negatively charged microsphere. Examples of a ferroelectric entity include, but are not limited to, microparticles of barium titanate, europium barium titanate, lead titanate, lead zirconate titanate, lithium niobate, potassium sodium tartarate, polyvinylidene fluoride, and so forth. Examples of density differing entities include materials that will provide density differential such as, for example, making part of the composition heavier using metal nanoparticles, heavy plastics, and the like; or making part of the composition lighter using gases (air, nitrogen and the like), low density polyethylene, and the like. Functionalized moieties may be microparticles coated with, for example, biotin; streptavidin; specific chemical groups such as acetyl, acyl, carboxyl, and so forth; specific polymer ligands; and so forth.

In some embodiments, the physical colorant, pigment, or ink comprising a microsphere composition may be separated or recycled by using at least one biodegradable component.

Colored Articles of Manufacture

Figure 4:
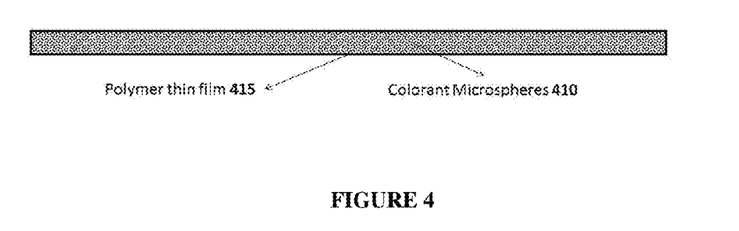
FIG. 4. Representative illustration of a colored thin film comprising a polymer and microsphere colorant composition.

In some embodiments, an article of manufacture which is at least partially coated or sprayed with a physical colorant, ink, or pigment comprising a microsphere composition described herein is provided. The physical colorant may form a thin film coating (as in FIG. 4) on the article of manufacture. In some embodiments, the thin film coating of FIG. 4, comprises a polymer thin film 415 which is substantially transparent to all optical wavelengths and colorant microspheres 410 described herein, dispersed within the film to impart color to the film. Examples of transparent polymers include, but are not limited to, polyethylene terephthalate, polyethylene, polypropylene, polyurethane, polymethyl dioxysilane, polymethyl methacralate, and so forth. In some embodiments, a pre-formed thin film is disposed on the article of manufacture which in other embodiments, the polymer and the microsphere composition are dispersed in a solvent and sprayed on to the article of manufacture in an aerosol form. In yet other embodiments, the polymer and the microsphere composition are disposed in a solvent and painted on to the article of manufacture, which is then treated to eliminate the solvent by, for example, evaporation.

Methods of Recycling Articles

In some embodiments, methods of separating an article of manufacture are provided in which the article of manufacture is at least partially coated or sprayed with a physical colorant, ink, or pigment comprising a microsphere composition described herein from a mixture of articles of manufacture by applying an electrostatic charge or magnetic field to the mixture of articles of manufacture, thereby separating the article of manufacture that is at least partially coated or sprayed with the physical colorant, ink, or pigment comprising a microsphere composition described herein, wherein the separation entity in the microsphere composition is an electrostatic or a magnetic entity.

Figure 5:
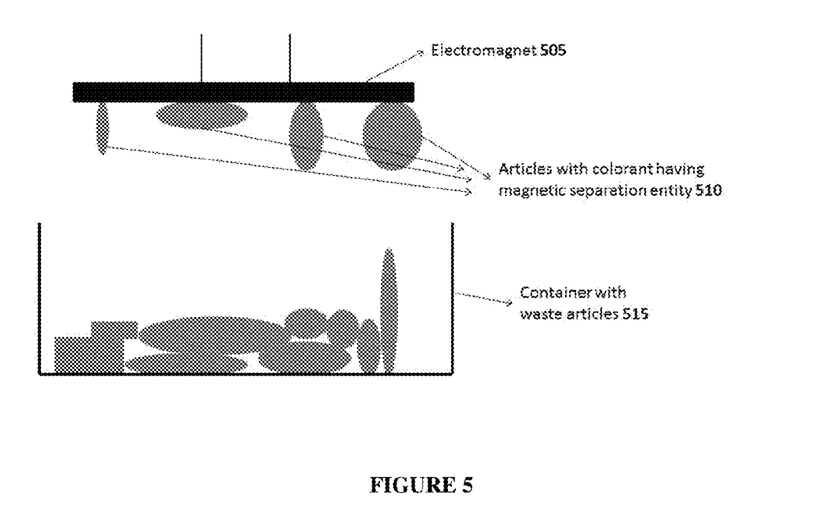
FIG. 5. Representative schematic of method of separating articles of manufacture colored with colorant microsphere composition comprising a magnetic separation entity.

In some embodiments, the article of manufacture at least partially coated or sprayed with the physical colorant, ink, or pigment may be a recyclable item. In some embodiments, the recyclable item may be a metal or a glass container. FIG. 5 illustrates one method of separating articles with a microsphere composition comprising a magnetic separation entity. A strong electromagnet 505 provides the magnetic force to separate the articles colored with microspheres comprising a magnetic separation entity 510 from a collection of waste articles 515.

In some embodiments, when the colorant microspheres are loosely associated with the article of manufacture such as, for example, being physically dispersed over the article of manufacture, the microspheres may be separated from the article of manufacture thereby decoloring the article of manufacture. For example, if the magnetic force provided by the electromagnet 505 is stronger than the force binding the microspheres and the article of manufacture, the microspheres may dissociate from the article of manufacture under the influence of the magnetic force, leaving an uncolored article of manufacture behind. In some aspects, methods of decoloring an article of manufacture for recycling are presented, wherein the article of manufacture is at least partially coated or sprayed with a physical colorant, ink, or pigment comprising a microsphere composition described herein, wherein the separation entity is an electrostatic or a magnetic entity, by separating the microspheres from the composition by application of electrostatic or magnetic fields to the composition.

Embodiments illustrating the methods and materials used may be further understood by reference to the following non-limiting examples:

EXAMPLES

Example 1

Preparing an Orange Colored Liquid-Solid Mixture Colorant

Glycerol and cellulose have differing dispersion curves that intersect at the wavelength of about 600 nm at room temperature. A 1:1 mixture of glycerol and cellulose is produced by mixing microcrystalline cellulose with particle size of 6 μm. The following calculation is used to determine the number of particles necessary for obtaining the requisite ratio:

Volume for a particle with a diameter d:

$$V = \frac{4}{3}\pi r^3 = \frac{4}{3}\pi \left(\frac{d}{2}\right)^3 = \frac{4}{3}\pi \frac{d^3}{8} = \frac{1}{6}\pi d^3 \quad (1)$$

Volume for n particles with a diameter d:

$$V_n = n\left(\frac{1}{6}\pi d^3\right) \quad (2)$$

Number of particles for a given volume:

$$n = \frac{6V_n}{\pi d^3} \quad (3)$$

Thus, for 1 liter of glycerol, the number of cellulose particles with a diameter of 6 μm diameter would be calculated as: $8.84 \times 10^{13}$ particles/l.

A polyurethane polymer/monomer mixture is injected at a high temperature into a moving solution of the glycerol-cellulose mixture to form microspheres of polyurethane thermoplastic encapsulating the glycerol-cellulose mixture. Depending on the rate of injection and the precise temperature, the polyurethane microspheres may have an average size of about 150 μm.

The wavelength of 600 nm corresponds to an orange color. Thus, these microspheres can be used as orange colorants and will be stable up to a temperature of about 464° F. (240° C.) which is the melting point of the polyurethane thermoplastic. Doping of the polyurethane or the glycerol-cellulose mixture with magnetic nanoparticles will render these orange microspheres separable by applying a strong magnetic field.

This composition is also a good example of a potentially temperature dependent colorant. The curvature of the dispersion curves of glycerol and cellulose will change as temperature changes. Thus, as temperature increases, in most cases, the wavelength at which the dispersion curves of the two materials intersect will shift changing the colors of the microspheres.

Example 2

Preparing a Red Colored Solid-solid Mixture Colorant

Polystyrene and barium crown glass (Bak-4) have differing dispersion curves that intersect at a wavelength of about 703 nm at room temperature. 703 nm corresponds to red color. A 1:1 mixture of microspheres of polystyrene and Bak-4 with average size of about 5 μm can be dispersion polymerized to form 50-100 μm microspheres as red colorants. The precise size of these larger microspheres may be controlled by adjusting the temperature at which the dispersion polymerization is carried out. Such polystyrene-Bak-4 red microspheres are compatible with processes such as injection molding.

Example 3

Superparamagnetic Colorants

Nanoparticles of superparamagnetic iron oxide ($Fe_3O_4$) may be added to the microspheres of Example 2 above to render them responsive to magnetic fields.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases at least one and one or more to introduce claim recitations. However, the use of such phrases should not be construed to imply that the introduction of a claim recitation by the indefinite articles "a" or an limits any particular claim containing such introduced claim recitation to embodiments containing only one such recitation, even when the same claim includes the introductory phrases one or more or at least one and indefinite articles such as "a" or an (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A microsphere composition comprising microspheres, wherein the microspheres comprise:
    a mixture of at least two materials of same or differing phases with differing optical dispersion curves that intersect at at least one particular wavelength; and
    a microsphere shell encompassing the mixture, wherein the at least two materials are selected from microcrystalline cellulose, polystyrene, or barium crown glass, and glycerol.

2. The composition of claim 1, wherein the microspheres have a diameter of about 1 µm to about 500 µm.

3. The composition of claim 1, wherein a ratio by weight of the at least two materials of same or differing phases is 1:1.

4. The composition of claim 1, further comprising at least one separation entity in one or more of the microsphere shell and the at least two materials of same or differing phases.

5. The composition of claim 4, wherein the separation entity is a magnetic entity, electrostatic entity, or a density differing entity.

6. The composition of claim 1, further comprising at least one colorant.

7. The composition of claim 1, wherein the microspheres comprise at least one functionalized moiety.

8. The composition of claim 1, wherein at least one of the components of the microspheres is biodegradable.

9. A physical colorant, ink, or pigment comprising a microsphere composition that comprises microspheres, wherein the microspheres comprise:
    a mixture of at least two materials of same or differing phases with differing optical dispersion curves that intersect at at least one particular wavelength; and
    a microsphere shell encompassing the mixture, wherein the at least two materials are selected from microcrystalline cellulose, polystyrene, or barium crown glass, and glycerol.

10. The physical colorant, ink, or pigment of claim 9, wherein the microspheres have a diameter of about 1 µm to about 500µm.

11. The physical colorant, ink, or pigment of claim 9, further comprising at least one separation entity in one or more of the microsphere shell and the mixture.

12. The physical colorant, ink, or pigment of claim 9, further comprising at least one colorant.

13. The physical colorant, ink, or pigment of claim 9, wherein the microspheres comprise at least one functionalized moiety.

14. An article of manufacture partially or completely coated or sprayed with a physical colorant, ink, or pigment that comprises a microsphere composition that comprises microspheres, wherein the microspheres comprise:
    a mixture of at least two materials of same or differing phases with differing optical dispersion curves that intersect at at least one particular wavelength; and
    a microsphere shell encompassing the mixture; wherein the at least two materials are selected from microcrystalline cellulose, polystyrene, or barium crown glass, and glycerol.

15. The article of manufacture of claim 14, wherein the microspheres have a diameter of about 1 µm to about 500 µm.

16. The article of manufacture of claim 14, further comprising at least one separation entity in one or more of the microsphere shell and the mixture.

17. The article of manufacture of claim 14, further comprising at least one colorant.

18. A method to separate a first article of manufacture from a mixture of articles of manufacture, the method comprising:
    applying an electrostatic charge or magnetic field to the mixture of articles of manufacture, thereby separating the first article of manufacture from the mixture of articles of manufacture,
    wherein only the first article of manufacture comprises a microsphere composition comprising microspheres, wherein the microspheres comprise:
        a mixture of at least two materials of same or differing phases with differing optical dispersion curves that intersect at at least one particular wavelength; and
        a microsphere shell encompassing the mixture, wherein the at least two materials are selected from microcrystalline cellulose, polystyrene, or barium crown glass, and glycerol.

19. The method of claim 18, wherein the first article of manufacture is a recyclable item.

20. A method to separate a microsphere from a polymer composition comprising the microsphere, the method comprising:

applying an electrostatic charge or magnetic field to the polymer composition comprising the microsphere, thereby separating the microsphere from the polymer composition comprising the microsphere, wherein the microsphere comprises:
- a mixture of at least two materials of same or differing phases with differing optical dispersion curves that intersect at at least one particular wavelength;
- a microsphere shell encompassing the mixture, wherein the at least two materials are selected from the group consisting of microcrystalline cellulose, polystyrene, or barium crown glass, and glycerol; and
- a separation entity in the microsphere shell or within the mixture, or both, wherein the separation entity is a magnetic entity or an electrostatic entity.

21. The composition of claim 1, wherein the microsphere composition is a Christiansen effect colorant, ink, or pigment.

* * * * *